United States Patent
Kilawee et al.

(10) Patent No.: US 6,656,353 B2
(45) Date of Patent: Dec. 2, 2003

(54) VENTURI FEEDER BYPASS AND CONTROL

(75) Inventors: Patrick H. Kilawee, Hugo, MN (US); Jamie W. Lerbs, Mendota Heights, MN (US); John E. Thomas, River Falls, WI (US)

(73) Assignee: Ecolab Inc., St. Paul, MN (US)

( * ) Notice: Subject to any disclaimer, the term of this patent is extended or adjusted under 35 U.S.C. 154(b) by 47 days.

(21) Appl. No.: 09/930,558

(22) Filed: Aug. 15, 2001

(65) Prior Publication Data
US 2003/0042207 A1 Mar. 6, 2003

(51) Int. Cl.[7] .................................................. C02F 5/14
(52) U.S. Cl. .................... 210/198.1; 137/268; 210/206; 422/263; 422/264; 422/282
(58) Field of Search ............... 137/268; 210/198.1, 210/206, 209; 422/263, 264, 282

(56) References Cited

U.S. PATENT DOCUMENTS

| | | | |
|---|---|---|---|
| 1,423,657 A | * 7/1922 | Haines | 422/282 |
| 2,536,361 A | * 1/1951 | Flanders | 422/119 |
| 2,573,576 A | 10/1951 | Klumb | 210/36 |
| 2,989,979 A | 6/1961 | Karlson | 137/268 |
| 4,908,190 A | * 3/1990 | Maglio et al. | 422/276 |
| 5,507,945 A | 4/1996 | Hansen | 210/198.1 |
| 5,580,448 A | 12/1996 | Brandreth, III | 210/206 |
| 6,221,321 B1 | 4/2001 | Fleischer et al. | 422/282 |
| 6,241,884 B1 | 6/2001 | Hansen | 210/198.1 |

* cited by examiner

Primary Examiner—Peter A. Hruskoci
(74) Attorney, Agent, or Firm—IPLM Group, P.A.

(57) ABSTRACT

A dispensing device (10) for dispensing a measured amount of a chemical (60) into a fluid piping system including a cap member (24) having a fluid inlet port (33) and a fluid outlet port (34) between which is a tubular flow conduit (28). The cap member (24) also includes bypass and control members (44), which align with an inlet passageway (36) and an outlet passageway (42) in the cap member (24). Fluid flows into the cap member (24) through the inlet port (33). The tubular flow conduit (28) has the inlet passageway (36) therein to divert a portion of the fluid passing through the system into a canister (11) operatively connected to the cap (24). A container (16) is disposed within the canister (11) containing the chemical (60), which is partially dissolved by fluid introduced into the container (16) to create a use solution. The use solution passes out of the canister (11) through the outlet passageway (42) in the tubular flow conduit (28) located downstream from the inlet passageway (36) and is reintroduced into the fluid system to flow out of the outlet port (34). The bypass and control members (44) may be used in variable positions to control and meter the amount of use solution being dispensed.

4 Claims, 2 Drawing Sheets

VENTURI FEEDER BYPASS AND CONTROL

BACKGROUND OF THE INVENTION

1. Field of the Invention

The present invention relates to a chemical dispensing device, and more particularly, a Venturi feeder bypass and control in the chemical dispensing device used to dispense a chemical product into a water stream passing through a water flow line.

2. Description of the Prior Art

The chemical treatment of water is commonly used to improve the treated water by preventing metals such as iron, calcium, copper and manganese from coming out of solution and forming scales on the water lines and vessels, among other things. Dispensing devices are used to meter desired amounts of the chemical product into the water stream, and the devices are inserted into the water flow line without disrupting the water stream. An example of such a device is disclosed in U.S. Pat. No. 5,507,945 by Hansen.

One problem with such devices is when dispenser failure occurs in a dish machine, especially in the sump portion of the dispenser which holds the product, the dish machine and the water source often must be shut off while repairing or replacing the device since the device is hard plumbed into the water feed line. A built in bypass and control assembly allows repairs to be performed and product to be added without shutting off the dish machine or the water supply and allows the product feed rate to be controlled.

SUMMARY OF THE INVENTION

In a preferred embodiment apparatus for use with a fluid piping system for dispensing a measured amount of a soluble chemical into a liquid flowing through the fluid piping system, wherein the fluid piping system includes a canister and a chemical holding container, the canister having a cavity in which the chemical holding container is placed and an opening allowing access to the cavity, a cap member is configured and arranged to cover the opening of the canister and has a first end and a second end. A fluid flow conduit extends through the cap member from the first end to the second end and has a reduced diameter proximate a center portion thereof. An inlet port of the fluid flow conduit is proximate the first end, and an outlet port of the fluid flow conduit is proximate the second end. A first passageway is positioned upstream of the reduced diameter of the fluid flow conduit and provides fluid communication between the fluid flow conduit and the cavity. A second passageway provides fluid communication between the cavity and the reduced diameter of the fluid flow conduit. A first opening is located in the cap member proximate the inlet port of the fluid flow conduit, and a second opening is located in the cap member proximate the reduced diameter of the fluid flow conduit. A first control member is configured and arranged for insertion into the first opening, and the first control member controls fluid flowing from the fluid flow conduit into the first passageway. A second control member is configured and arranged for insertion into the second opening, and the second control member controls fluid flowing out of the second passageway into the fluid flow conduit.

In another preferred embodiment apparatus for use with a fluid piping system for dispensing a measured amount of a soluble chemical into a liquid flowing through the fluid piping system, wherein the fluid piping system includes a canister and a chemical holding container, the canister having a cavity in which the chemical holding container is placed and an opening allowing access to the cavity, a cap member is configured and arranged to cover the opening of the canister and has a first end and a second end. A fluid flow conduit extends through the cap member from the first end to the second end and has a reduced diameter proximate a center portion thereof. An inlet port of the fluid flow conduit is proximate the first end, and an outlet port of the fluid flow conduit is proximate the second end. A first passageway is positioned upstream of the reduced diameter of the fluid flow conduit and provides fluid communication between the fluid flow conduit and the cavity. A second passageway provides fluid communication between the cavity and the reduced diameter of the fluid flow conduit. A first opening is located in the cap member proximate the inlet port of the fluid flow conduit, and a second opening is located in the cap member proximate the reduced diameter of the fluid flow conduit. A first control member is configured and arranged for insertion into the first opening for controlling fluid flowing from the fluid flow conduit into the first passageway, and a second control member is configured and arranged for insertion into the second opening for controlling fluid flowing out of the second passageway into the fluid flow conduit. The first control member and the second control member have an open position and a control position, whereby fluid is prevented from flowing into the first passageway when the first control member is in a closed position and fluid is prevented from flowing out of the second passageway when the second control member is in a closed position.

In a preferred embodiment method of controlling a measured amount of a soluble chemical dispensed into a liquid flowing through a flow line, fluid is allowed to pass through a fluid flow conduit of a cap member. The cap member is configured and arranged to cover an opening of a canister and has a first end and a second end. The fluid flow conduit extends through the cap member from the first end to the second end and has a reduced diameter proximate a center portion thereof. The fluid enters the fluid flow conduit through an inlet port and exits the fluid flow conduit through an outlet port, the inlet port being proximate the first end and the outlet port being proximate the second end. The fluid is allowed to flow into a first passageway and into the canister containing a soluble chemical where the fluid dissolves a portion of the soluble chemical to create a use solution. The first passageway is positioned upstream of the reduced diameter of the fluid flow conduit and provides fluid communication between the fluid flow conduit and the canister. The use solution is then allowed to flow into a second passageway being positioned downstream of the first passageway, into the fluid flow conduit, and out of the outlet port. The second passageway provides fluid communication between the canister and the reduced diameter of the fluid flow conduit. A control member configured and arranged for insertion into the first passageway and the second passageway is used to meter a measured amount of the use solution flowing into the fluid flow conduit.

In a preferred embodiment bypass and control member for use with a chemical dispensing device, the chemical dispensing device having a canister, a chemical holding container and a cap member. The canister has a cavity in which the chemical holding container is placed and an opening allowing access to the cavity. The cap member is configured and arranged to cover the opening of the canister and has a first end and a second end. The cap member also has a fluid flow conduit extending through the cap member from the first end to the second end and has a reduced diameter proximate a center portion thereof. The fluid flow conduit has an inlet port proximate the first end and an outlet port proximate the second end. The fluid flow conduit also has a first passageway positioned upstream of the reduced diameter providing fluid communication between the fluid flow conduit and the cavity and a second passageway positioned downstream of the first passageway providing fluid communication between the cavity and the reduced diameter of the fluid flow conduit. A first opening is located in the cap member proximate the inlet port of the fluid flow conduit and is in alignment with the first passageway. A second opening is located in the cap member proximate the reduced diameter of the fluid flow conduit downstream from the first opening and is in alignment with the second passageway. A control in assembly includes a first bushing and a first stem. The first bushing is configured and arranged to fit within the first opening and has a first threaded inside surface. The first stem includes a first threaded portion that threads into the first threaded inside surface to operatively connect thereto, and the first stem is configured and arranged to fit within the first passageway thereby preventing fluid from entering the first passageway. A control out assembly includes a second bushing and a second stem. The second bushing is configured and arranged to fit within the second opening and has a second threaded inside surface. The second stem includes a second threaded portion that threads into the second threaded inside surface to operatively connect thereto. The second stem is configured and arranged to fit within the second passageway thereby preventing fluid from entering the second passageway. The control in assembly and the control out assembly have an open position, wherein the control in assembly and the control out assembly are in an upward position relative to the first passageway and the second passageway. There is also a control position including a metering position and a closed position, wherein the control in assembly and the control out assembly are in a downward position relative to the first passageway and the second passageway thereby preventing fluid from entering the first passageway and the second passageway when in the closed position, and wherein the control in assembly and the control out assembly are in an intermediate position relative to the first passageway and the second passageway thereby metering fluid entering the first passageway and the second passageway.

In a preferred embodiment method of controlling a measured amount of a soluble chemical dispensed into a liquid flowing through a flow line, fluid is allowed to pass through a fluid flow conduit of a cap member. The cap member is configured and arranged to cover an opening of a canister and has a first end and a second end. The fluid flow conduit extends through the cap member from the first end to the second end and has a reduced diameter proximate a center portion thereof. The fluid enters the fluid flow conduit through an inlet port and exits the fluid flow conduit through an outlet port. The inlet port is proximate the first end and the outlet port is proximate the second end. Fluid is then allowed to flow into a first passageway and into the canister containing a soluble chemical where the fluid dissolves a portion of the soluble chemical to create a use solution. The first passageway is positioned upstream of the reduced diameter of the fluid flow conduit and provides fluid communication between the fluid flow conduit and the canister. The use solution is allowed to flow into a second passageway being positioned downstream of the first passageway, into the fluid flow conduit, and out of the outlet port. The second passageway provides fluid communication between the canister and the reduced diameter of the fluid flow conduit. A control member configured and arranged for insertion into one of the first and second passageways is used to meter a measured amount of the use solution flowing into the fluid flow conduit.

In another preferred embodiment method of controlling a dispensing device for dispensing a chemical into a fluid flowing through a fluid flow line, fluid is allowed to pass through a fluid flow conduit of a cap member. The cap member is configured and arranged to cover an opening of a canister containing a soluble chemical and has a first end and a second end. The fluid flow conduit extends through the cap member from the first end to the second end and has a reduced diameter proximate a center portion thereof. The fluid enters the fluid flow conduit through an inlet port and exits the fluid flow conduit through an outlet port. The inlet port is proximate the first end and the outlet port is proximate the second end. The fluid flow conduit includes a first passageway and a second passageway. The first passageway allows the fluid to flow into the canister to dissolve a portion of the soluble chemical to create a use solution, and the second passageway allows the use solution to flow into the fluid flow conduit. The first and second passageways are sealed, and the canister is removed from the cap member, wherein fluid continues to flow through the fluid flow conduit without escaping through the first and second passageways.

In a preferred embodiment bypass and control member for use with a chemical dispensing device, a housing has a first end, a second end, and a fluid flow conduit. The fluid flow conduit extends through the housing from the first end to the second end and has a reduced diameter proximate a center portion thereof. The fluid flow conduit has an inlet port proximate the first end and an outlet port proximate the second end. The fluid flow conduit also has a passageway providing fluid communication between the chemical dispensing device and the reduced diameter of the fluid flow conduit. An opening located in the housing is in alignment with the passageway. A control member is configured and arranged for insertion into the opening, whereby the control member may be extended into the passageway to prevent fluid communication between the chemical dispensing device and the reduced diameter of the fluid flow conduit.

DETAILED DESCRIPTION OF THE PREFERRED EMBODIMENT

Figure 1:
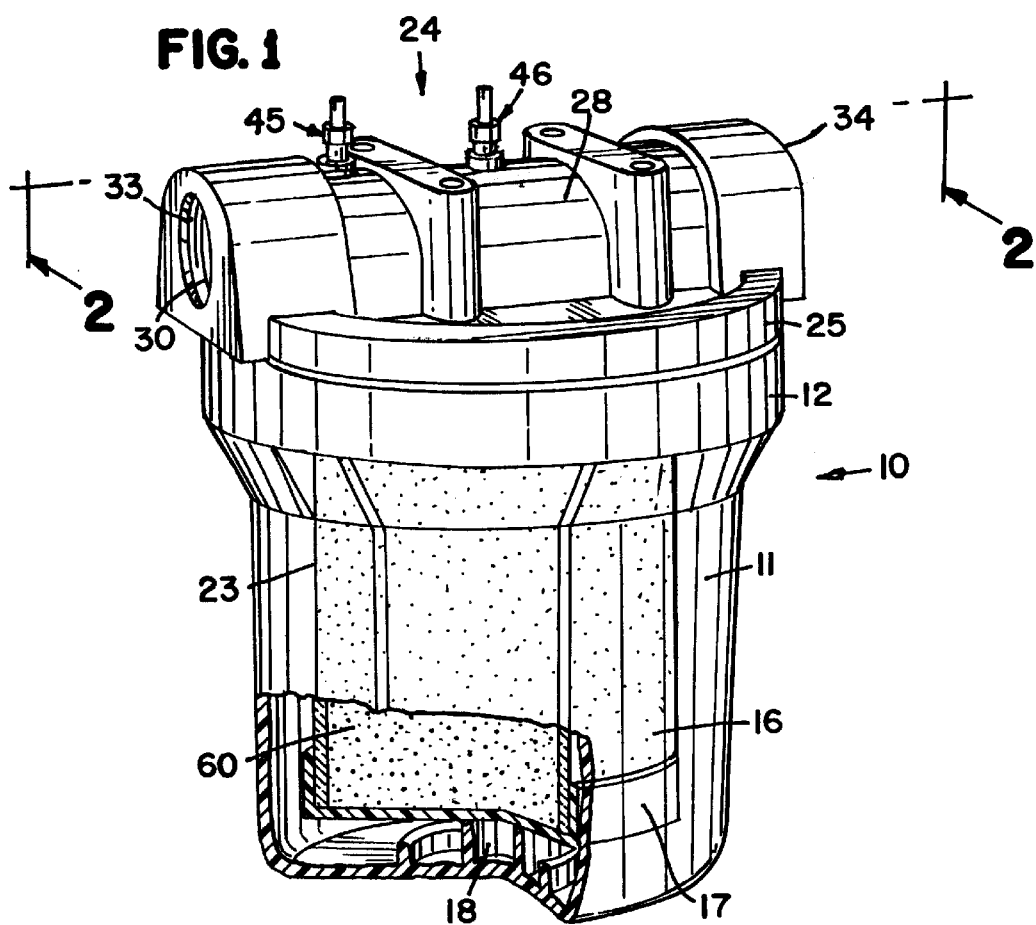
FIG. 1 is a perspective view partially broken away of a chemical dispensing device constructed according to the principles of the present invention.

A preferred embodiment chemical dispensing device according to the principles of the present invention is designated by the numeral 10, as shown in FIG. 1, and includes an outer canister 11, which is preferably made from a strong, durable material such as plastic. The canister 11 is generally cylindrical in shape and has a flared neck portion 12 with threads 13. Preferably, an elastomeric gasket 14 is configured and arranged to fit within the neck 12 to assist in sealing a cap member 24 on the neck 12 of the canister 11. Adapted for insertion into canister 11 is a cylindrical container 16. The bottom of container 16 is sealed such as by bottom closure 17. The dimensions of container 16 are such that it easily fits within the canister leaving a small annular space therebetween. The sealed bottom of the container 16 rests on upstanding spacer 18, which serves to permit fluid flow underneath and around container 16. The container 16 is of such height that when resting on spacer 18, its top surface is approximately planar with the top surface of canister 11. The container 16 is preferably made of plastic. The bottom of the container 16 is sealed but has a removable top (not shown) in which a centrally located hole (not shown) is provided. A plurality of small apertures 23, preferably four, are spaced around the periphery of the container 16 near the removable top.

The chemical dispensing device 10 also includes a cap member 24, which includes a circular base 25 having threads 27 that mate with the threads 13 on the neck 12 of canister 11 and that permit the cap 24 to be securely attached to and seal the canister 11. Carried on the top of cap base 25 is the tubular flow conduit 28, which has a reduced diameter along a center portion of its length. However, it is understood that a housing including a fluid flow conduit may be used rather than a cap member 24. Threaded attachment means 30 and 32 are respectively disposed at the inlet port 33 at a first end and outlet port 34 at a second end of the flow conduit 28. An inlet passageway 36 located upstream of the reduced diameter provides fluid communication between the interior of flow conduit 28 and the annular space 37 between inner container 16 and canister 11.

Downwardly depending from the base 25 of the cap is a hollow, generally cylindrical mating member 38 which is configured and arranged to be received in the opening of chemical container 16. Seal member 40 extends circumferentially around member 38 and forms a seal between it and the opening of the chemical container. An outlet passageway 42 located downstream from the inlet passageway 36 provides fluid communication between the interior of chemical container 16 and the portion of the flow conduit 28 of reduced diameter. The chemical dispensing device described thus far is known and is described in U.S. Pat. No. 5,507,945 by Hansen, which is incorporated by reference herein, and the invention to be described can be used with this type of dispensing device or other types of suitable dispensers known in the art.

Figure 3:
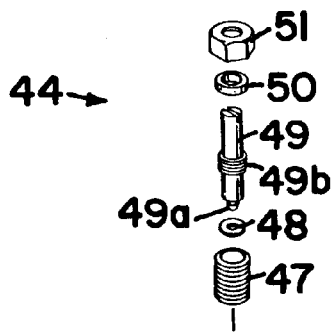
FIG. 3 is an exploded perspective view of the cap member shown in FIG. 2.
Figure 3:
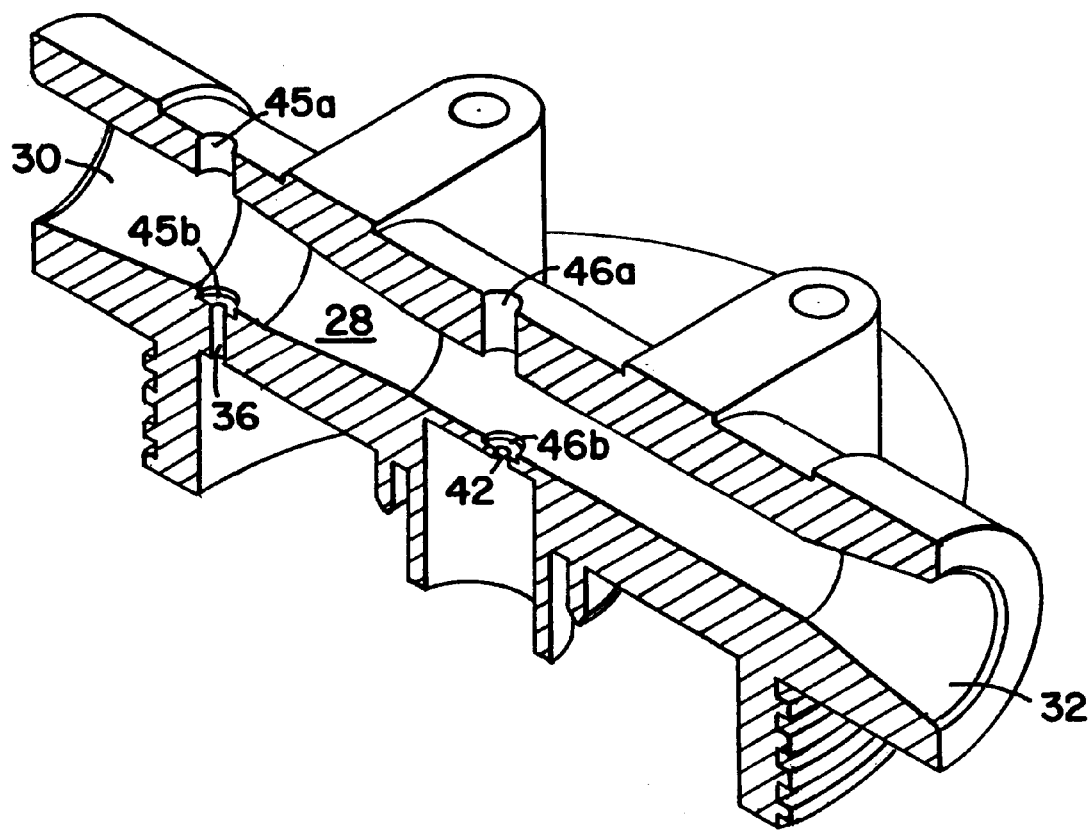

Also included on cap member 24 and carried on the top of cap base 25 is a bypass and control member 44, which in the preferred embodiment is a needle valve. The bypass and control member 44 is shown in FIG. 3 and includes a bushing 47, an O-ring 48, a stem 49, a washer 50, and a nut 51. The cap member 24 also includes opening 45a, opening 45b, opening 46a, and opening 46b. Opening 45a is threaded and is located proximate the inlet port 33. The opening 45a is configured and arranged to accept a bypass and control member 44 placed through the top of the cap member 24 and into the tubular flow conduit 28. Opening 45b is aligned with opening 45a and allows the bypass and control member 44 to be placed through the tubular flow conduit 28 into the inlet passageway 36, and opening 45b is configured and arranged to receive the O-ring 48. The combination of the bypass and control member 44 being placed in opening 45a represents a control in assembly 45. Similarly, opening 46a is threaded and is located more proximate the center of the tubular flow conduit 28. The opening 46a is configured and arranged to accept a bypass and control member 44 placed through the top of the cap member 24 and into the tubular flow conduit 28. Opening 46b is aligned with opening 46a and allows the bypass and control member 44 to be placed through the tubular flow conduit 28 into the outlet passageway 42, and opening 45b is configured and arranged to receive the O-ring 48. The combination of the bypass and control member 44 being placed in opening 46a represents a control out assembly 46.

The bushing 47 of the bypass and control member 44 is cylindrical with a bore extending lengthwise therethrough and has threaded inside and outside surfaces. A bushing 47 is configured and arranged to fit within each of the openings 45a and 46a. The stem 49 is cylindrical and has a diameter that allows it to fit within the bushing 47 and a length that allows it to extend from the nut 51 to the respective passageways 36 and 42. The stem 49 includes a seat 49a and threads 49b. The seat 49a is like a stopper operatively connected to the end of the stem 49 and is configured and arranged to fit within the respective passageways 36 and 42. The threads 49b cooperate with the threads on the inside surface of the bushing 47 to operatively connect the stem 49 to the bushing 47. The O-ring 48 is operatively connected to the stem 49 proximate the seat 49a to effectively seal the respective passageways 36 and 42 in openings 45b and 46b when the seat 49a is in a downward, closed position. The washer 50 is placed around the stem 49 above the threads 49b and then the nut 51 is screwed onto the top of the bushing 47. Although the preferred embodiment shows two separate bypass and control members 44 being utilized, it is recognized that variations of this concept may be used. For example, one unit may be used and the stem could be forked thereby having two seats extending to the respective passageways.

Figure 2:
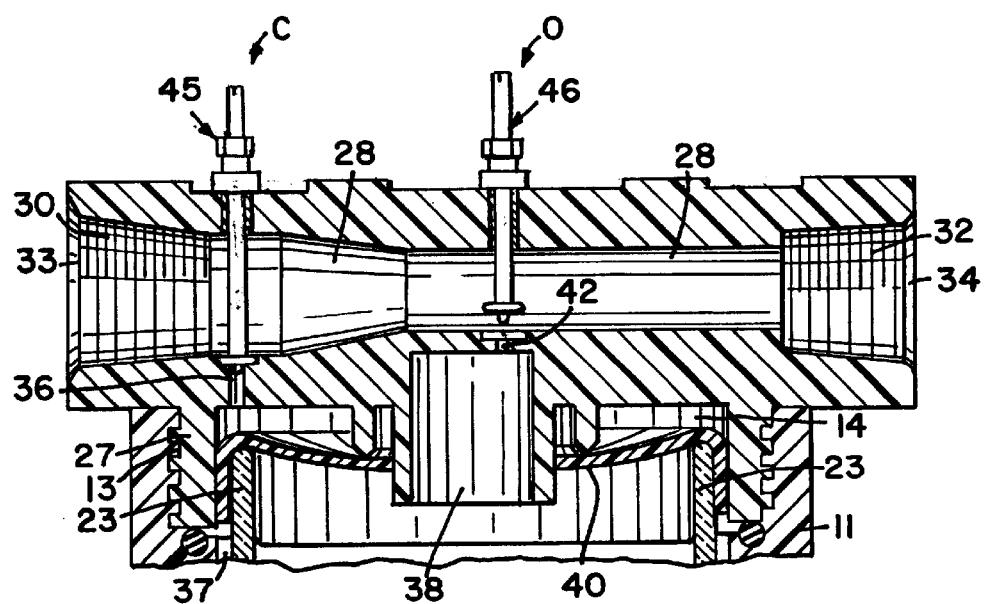
FIG. 2 is cross-sectional view of a cap member of the chemical dispensing device taken along the lines 2—2 in FIG. 1.

The control in assembly 45 and the control out assembly 46 should not occupy a percentage of space within the tubular flow conduit 28 that will significantly hinder the flow of fluid through the conduit 28. Therefore, the smaller the diameters of the assemblies 45 and 46 the more fluid will be allowed to flow through the conduit 28 thereby increasing the effectiveness of the Venturi. The bypass and control member 44 acts as a control member having an open position O and a control position, and the control position includes a metering position and a closed position C. In the open position O, the stem 49 is in an upward position and therefore the seat 49a does not interfere with the passageway. The upward, open position O is shown in FIG. 2. In the closed position C, the stem 49 is in a downward position and the seat 49a fits within the passageway to effectively seal and block the flow of liquid into and out of the cylindrical container 16. The downward, closed position C is also shown in FIG. 2. FIG. 2 shows the control in assembly 45 and the control out assembly 46 in different positions simply to illustrate two possible positions of the bypass and control member 44. The preferred embodiment utilizes the control in assembly 45 and the control out assembly 46 in the same open or closed positions. In the metering position, the stem 49 is positioned proximate the passageway to partially block the passageway with the seat 49a thereby metering a desired amount of liquid into and/or out of the cylindrical container 16. The position of the seat 49a depends upon how much use solution is desired. The closer the seat 49a is to the passageway, the less use solution will be used and vice versa. Either the control in assembly 45 or the control out assembly 46 or both may be adjusted to effect the desired metering of the use solution. For optimum control, the control out assembly 46 is adjusted proximate the outlet passageway 42 to meter in the amount of use solution entering the conduit 28 because allowing the full amount of fluid to enter the inlet passageway 36 will best facilitate the Venturi effect. The metering position varies depending upon the desired amount of chemical treating agent 60 to be dispensed.

The chemical dispensing device 10 can be used to treat water or other liquids with a variety of chemicals known to be useful for a particular application. For example, various phosphate compounds are useful for treating water to reduce corrosion and/or scale build-up. Examples of water treating compositions are disclosed in U.S. Pat. Nos. 2,370,472, 2,370,473, 3,043,772 and 3,432,428. It is preferred that the chemical treating agent be utilized in caked or molded form and, or course, the chemical agent should have some degree of solubility in the liquid being treated. Thus, in the case of water-treating chemicals, a caked or molded form thereof can be prepared by removing water from a saturated or super-saturated solution thereof. Similarly, the size of the chemical dispenser and the component parts thereof can be varied depending upon the application, and more particularly, the volume of liquid to be treated.

For use in treating water in a ⅞ inch diameter line, the components of the dispensing device 10 could have the following approximate dimensions:

| Component | Dimensions |
|---|---|
| canister (11) overall height | 5½ inches |
| canister (11) internal diameter | 3 inches |
| external diameter of flared neck (12) | 3¾ inches |
| chemical container (16) overall height | 5 inches |
| chemical container (16) diameter | 2¾ inches |
| tubular flow conduit (28) on cap (24) | 5 inches total length |
| reduced diameter portion of tubular flow conduit (28) | 2¼ inches length |
| inlet passageway (36) | located 1 inch from entrance to inlet port (33) |
| outlet passageway (42) | located 2½ inches from entrance to inlet port (33), diameter 2/16 inch |

A dispenser having the above approximate dimensions can hold in cake form approximately 330 grams of chemical agent. With a water flow rate that is or can be variable up to 10 gallons per minute, approximately 35,000 gallons of water can be treated before refill of the chemical is necessary. Under these conditions, the concentration of the water treating chemical, say, for example, is approximately four parts per million. The concentration of the chemical can be controlled by varying the aperture dimension of outlet passageway 42 or by utilizing the bypass and control members 44 in the variable metering positions.

For use, a chemical treating agent 60 in cake form is placed in container 16 and its removable top attached thereto. The container 16 is then placed within canister 11 and cap 24 securely threaded onto the canister 11. Inlet port 33 is then attached to a line carrying a liquid to be treated, such as a water line, and likewise outlet port 34 is attached to the line. Once inserted into the fluid line, the cap can remain therein permanently and the canister 11 and container 16 can be removed from the cap for replenishment of the chemical treating agent.

In operation with the control in assembly 45 and the control out assembly 46 in the open position O, liquid, for example water, enters inlet port 33 and flows through fluid conduit 28. The reduced diameter portion of conduit 28 creates a Venturi flow effect with the higher pressure on the inlet side causing water to flow through passageway 36 into the annular space 37 surrounding chemical container 16. As this annular space 37 fills with water, the water enters container 16 through the spaced apertures 23 therein and erodes and dissolves the chemical 60 contained therein to create a use solution. Water containing dissolved chemical, the use solution, is then passed upwardly through fluid passageway 42 and back into flow conduit 28 from which it exits through outlet port 34.

In the closed position C, the control in assembly 45 and the control out assembly 46 are placed in the downward position thereby effectively sealing the inlet passageway 36 and the outlet passageway 42 with the seats 49a and the O-rings 48 and preventing fluid from entering inlet passageway 36 or exiting outlet passageway 42. However, fluid can still flow through the flow conduit 28. In this position, the canister 11 may be removed for repairs or replacement of chemical without having to shut off the fluid source or the equipment.

In the metering position, the control in assembly 45 and the control out assembly 46 may be placed in variable positions proximate the respective passageways 36 and 42 thereby metering the amount of fluid and use solution that enters and exits the passageways, respectively. The higher the stems 49 are placed relative to the passageways, the more fluid and use solution will be allowed to pass through the dispensing device 10. Conversely, the lower the stems 49 are placed relative to the passageways, the less fluid and use solution will be allowed to pass through the dispensing device 10. Alternatively, the stem 49 of either one of the assemblies 45 or 46 may be used to restrict or even stop the flow of fluid through the canister 11 to obtain the desired concentration of use solution. That is to say, only one bypass and control member 44 is needed to effectively meter the amount of use solution created. The positions of the stems 49 depend upon the desired concentration of chemical treating agent 60 to be dispensed into the fluid.

The dispensing device 10 is particularly adapted for permanent insertion into a water line to reduce corrosion and scale formation created by impurities in the water. Potential uses include insertion into a water line for heat exchange equipment such as steamers, booster heaters, and dish machines. Other uses include use in post-mix drink fountains, ice machines, and coffee makers. The dispenser can also be utilized to dispense fertilizer compositions, plant foods or to chlorinate swimming pools.

As will be appreciated, the chemical dispensing device 10 is of simplified construction and does not involve complex mechanical moving parts. The components thereof can be formed from readily available, inexpensive materials. The dispenser 10 can easily be inserted into a fluid piping system without the use of special tools or expertise and it automatically and accurately dispenses a desired amount of chemical into fluid flow. The device 10 also allows maintenance and repairs to be performed without shutting off the fluid source or the equipment, and fluid may still flow through the fluid flow conduit 28. While the chemical 60 held in container 16 is preferably in molded, dried or cake form, it can also be utilized in powdered or granular form as well.

The above specification, examples and data provide a complete description of the manufacture and use of the composition of the invention. Since many embodiments of the invention can be made without departing from the spirit and scope of the invention, the invention resides in the claims hereinafter appended.

We claim:

1. An apparatus for use with a fluid piping system for dispensing a measured amount of a soluble chemical into a liquid flowing through the fluid piping system, wherein the fluid piping system includes a canister and a chemical holding container, the canister having a cavity in which the chemical holding container is placed and an opening allowing access to the cavity, comprising:
  a. a cap member, said cap member being configured and arranged to cover the opening of the canister and having a first end and a second end;
  b. a fluid flow conduit, said fluid flow conduit extending through said cap member from said first end to said second end and having a reduced diameter proximate a center portion thereof;
  c. an inlet port of said fluid flow conduit, said inlet port being proximate said first end,
  d. an outlet port of said fluid flow conduit, said outlet port being proximate said second end;
  e. a first passageway positioned upstream of said reduced diameter of said fluid flow conduit and providing fluid communication between said fluid flow conduit and the cavity;
  f. a second passageway providing fluid communication between the cavity and said reduced diameter of said fluid flow conduit;
  g. a first opening located in said cap member proximate said inlet port of said fluid flow conduit;
  h. a second opening located in said cap member proximate said reduced diameter of said fluid flow conduit;
  i. a first control member, said first control member being configured and arranged for insertion into said first opening, said first control member controlling fluid flowing from said fluid flow conduit into said first passageway; and
  j. a second control member, said second control member being configured and arranged for insertion into said second opening, said second control member controlling fluid flowing out of said second passageway into said fluid flow conduit, said first control member and said second control member having an open position and a control position, said control position including a closed position and a metering position, said first control member being inserted into said first opening and said second control member being inserted into said second opening when in said closed position, said closed position preventing flow through said first opening and said second opening thereby allowing the canister and the chemical holding container to be removed from said cap member without interrupting operation of said cap member.

2. An apparatus for use with a fluid piping system for dispensing a measured amount of a soluble chemical into a liquid flowing through the fluid piping system, wherein the fluid piping system includes a canister and a chemical holding container, the canister having a cavity in which the chemical holding container is placed and an opening allowing access to the cavity, comprising:
  a. a cap member, said cap member being configured and arranged to cover the opening of the canister and having a first end and a second end;
  b. a fluid flow conduit, said fluid flow conduit extending through said cap member from said first end to said second end and having a reduced diameter proximate a center portion thereof;
  c. an inlet port of said fluid flow conduit, said inlet port being proximate said first end;
  d. an outlet port of said fluid flow conduit, said outlet port being proximate said second end;
  e. a first passageway positioned upstream of said reduced diameter of said fluid flow conduit and providing fluid communication between said fluid flow conduit and the cavity;
  f. a second passageway providing fluid communication between the cavity and said reduced diameter of said fluid flow conduit;
  g. a first opening located in said cap member proximate said inlet port of said fluid flow conduit;
  h. a second opening located in said cap member proximate said reduced diameter of said fluid flow conduit;
  i. a first control member, said first control member being configured and arranged for insertion into said first opening, said first control member controlling fluid flowing from said fluid flow conduit into said first passageway; and
  j. a second control member, said second control member being configured and arranged for insertion into said second opening, said second control member controlling fluid flowing out of said second passageway into said fluid flow conduit, said first control member including a first stem and a first bushing and said second control member including a second stem and a second bushing, said first and second stems each having a threaded portion and said first and second bushings each having a threaded inside surface, wherein said threaded portion of said first and second stems is operatively connected to said threaded inside surface of said first and second bushings, respectively, and said first bushing is operatively connected to said first opening and said second bushing is operatively connected to said second opening.

3. An apparatus for use with a fluid piping system for dispensing a measured amount of a soluble chemical into a liquid flowing through the fluid piping system, wherein the fluid piping system includes a canister and a chemical holding container, the canister having a cavity in which the chemical holding container is placed and an opening allowing access to the cavity, comprising:
  a. a cap member, said cap member being configured and arranged to cover the opening of the canister and having a first end and a second end;
  b. a fluid flow conduit, said fluid flow conduit extending through said cap member from said first end to said second end and having a reduced diameter proximate a center portion thereof;
  c. an inlet port of said fluid flow conduit, said inlet port being proximate said first end;
  d. an outlet port of said fluid flow conduit, said outlet port being proximate said second end;
  e. a first passageway positioned upstream of said reduced diameter of said fluid flow conduit and providing fluid communication between said fluid flow conduit and the cavity;
  f. a second passageway providing fluid communication between the cavity and said reduced diameter of said fluid flow conduit;
  g. a first opening located in said cap member proximate said inlet port of said fluid flow conduit;
  h. a second opening located in said cap member proximate said reduced diameter or said fluid flow conduit; and
  i. a first control member and a second control member, said first control member being configured and arranged for insertion into said first opening for controlling fluid flowing from said fluid flow conduit into said first passageway, said second control member being configured and arranged for insertion into said second opening for controlling fluid flowing out of said second passageway into said fluid flow conduit, said first control member and said second control member have an open position and a control position, whereby fluid is prevented from flowing into said first passageway when said first control member is in a closed position and fluid is prevented from flowing out of said second passageway when said second control member is in a closed position.

4. An apparatus for use with a fluid piping system for dispensing a measured amount of a soluble chemical into a liquid flowing through the fluid piping system, wherein the fluid piping system includes a canister and a chemical holding container, the canister having a cavity in which the chemical holding container is placed an opening allowing access to the cavity, comprising:

a. a cap member, said cap member being configured and arranged to cover the opening of the canister and having a first end and a second end;

b. a fluid flow conduit, said fluid flow conduit extending through said cap member from said first end to said second end and having a reduced diameter proximate a center portion thereof;

c. an inlet port of said fluid flow conduit, said inlet port being proximate said first end;

d. an outlet port of said fluid flow conduit, said outlet port being proximate said second end;

e. a first passageway positioned upstream of said reduced diameter of said fluid flow conduit and providing fluid communication between said fluid flow conduit and the cavity;

f. a second passageway providing fluid communication between the cavity and said reduced diameter of said fluid flow conduit;

g. a first opening located in said cap member proximate said inlet port of said fluid flow conduit;

h. a second opening located in said cap member proximate said reduced diameter of said fluid flow conduit; and j. a first control member and a second control member, said first control member being configured and arranged for insertion into said first opening for controlling fluid flowing from said fluid flow conduit into said first passageway, said second control member being configured and arranged for insertion into said second opening for controlling fluid flowing out of said second passageway into said fluid flow conduit, said first control member and said second control member have an open position and a control position, whereby fluid is prevented from flowing into said first passageway when said first control member is in a closed position and fluid is prevented from flowing out of said second passageway when said second control member is in a closed position, said first control member including a first stem and a first bushing and said second control member including a second stem and a second bushing, said first and second stems each having a threaded portion and said first and second bushings each having a threaded inside surface, wherein said threaded portion of said first and second stems is operatively connected to said threaded inside surface of said first and second bushings, respectively, and said first bushing is operatively connected to said first opening and said second bushing is operatively connected to said second opening.

\* \* \* \* \*

UNITED STATES PATENT AND TRADEMARK OFFICE
CERTIFICATE OF CORRECTION

PATENT NO.    : 6,656,353 B2
DATED         : December 2, 2003
INVENTOR(S)   : Patrick H. Kilawee, Jamie W. Lerbs and John E. Thomas It is certified that error appears in the above-identified patent and that said Letters Patent is hereby corrected as shown below:

Column 10,
Line 59, delete "or" and insert therefor -- of --.

Column 11,
Line 13, insert -- and -- after "placed".

Signed and Sealed this

Twentieth Day of April, 2004

JON W. DUDAS
*Acting Director of the United States Patent and Trademark Office*